United States Patent Office 3,272,761
Patented Sept. 13, 1966

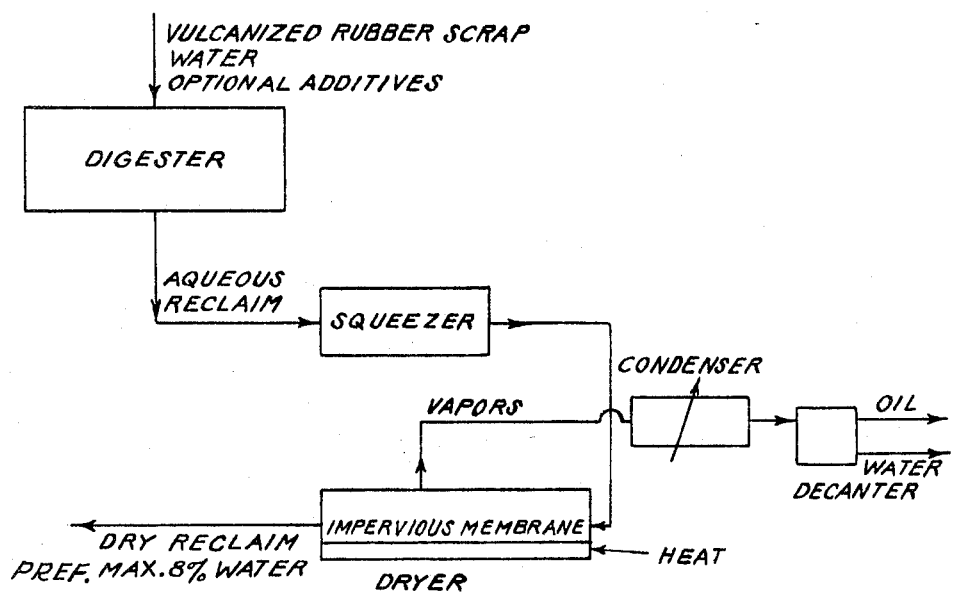
INVENTORS
HARRY D. GLENN
WALTER J. MARKIEWICZ
BY Kurt Shaffert
ATTORNEY

3,272,761
METHOD OF RECLAIMING RUBBER
Harry D. Glenn, Baton Rouge, La., and Walter J. Markiewicz, Watertown, Conn., assignors to United States Rubber Company, New York, N.Y., a corporation of New Jersey
Filed Sept. 27, 1961, Ser. No. 141,025
Claims priority, application Canada, Sept. 1, 1961, 830,989
3 Claims. (Cl. 260—2.3)

This invention relates to an improved method of reclaiming vulcanized elastomer material, such as scrap vehicular tires which contain fibers in the scrap.

Vulcanized rubber scrap is usually reclaimed by one of three conventional methods, that is, by the "heater" or semi-dry process, by the so-called "mechanical" process, or by the "digester" or solution process. The reclaiming in the "digester" or "heater" or so-called "mechanical" process may take place at the usual reclaiming temperature of at least 300° F., which is above that required for vulcanization. In general, the "digester" and "heater" reclaiming take place at temperatures from about 300° F. to about 420° F., and the temperature of the "mechanical" reclaiming process may go higher to about 550° F.

In the usual "heater" process, ground rubber scrap in a dried, or somewhat moistened condition (about 1 to 10 parts by weight of water per 100 parts of scrap), is heated with live steam under pressure in trays or pans in an autoclave, usually with the addition of softening agents, until the rubber becomes plasticized. The plasticized scrap is then removed from the "heater" and milled. One of the primary advantages of the "heater" process is that subsequent washing and drying are not required. However, the scrap rubber usually treated by the heater process is free from fiber as when fiber is present the processing period required to destroy the same by heat alone is unusually long and the chemicals employed to shorten this period such as caustic soda leave a residue that is detrimental to the finished reclaim unless it is washed. For example, when heat or steam alone is used a minimum processing period of 24 hours at 150 pounds is required to sufficiently destroy the fiber for milling purposes. When caustic soda is added to hasten the destruction of fiber, six to eight percent based on the weight of the scrap is necessary and the residue from this is known to be detrimental to rubber goods. The washing and drying operations required to remove this residue defeat one of the primary advantages of the heater process, i.e., the avoidance of such operations.

The so-called mechanical process is essentially a mechanical working of the dry rubber scrap at an elevated temperature, as in the "Hot Banbury" process or in the "Reclaimator" process. Like the heater process, the mechanical process is generally confined to the treatment of fiber free scrap rubber as it is uneconomical to attempt to remove the fiber from finely ground scrap prior to reclaiming.

In the "digester" process, a charge of ground or shredded vulcanized rubber scrap and about 100 to 300 parts by weight per 100 parts of scrap of water or a water solution of fiber—destroying chemical, such as caustic soda, calcium chloride, or zinc chloride if fiber-containing scrap is to be digested, is heated under pressure in a closed steam jacketed container, or a container into which steam is introduced, equipped with an agitator until the fiber, if any, in the scrap is partially or wholly destroyed, and the rubber becomes plasticized. The charge is then washed free from such added chemicals, dried and milled on a friction refiner which blends the stock and plasticizes it further. Those portions of the rubber particles not properly plasticized are removed as tailings. To make the digester process more uniform as well as more economical plasticizing or swelling "oils" are usually added. By adding such oils either the time or the temperature of heating may be reduced, the milling improved and the percentage of tailings reduced. The oils are those derived from the distillation of wood, petroleum and coal, as well as fatty acids and asphaltic base softeners. The lower boiling fractions of such distillates are usually referred to as swelling oils and include mineral spirits, pine oil, mineral oil, and palm oil, as well as crude or refined solvent naphtha, petroleum naphtha, turpentine, dipentene and cymene. The higher boiling fractions of such distillates are usually referred to as plasticizing oils and include pine rosin, petroleum and coal asphalts, pine, petroleum and coal tar residues, petrolatum, paraflux (asphalt residue from cracking crude petroleum—United States Patent No. 1,611,436), and coumarone resins. In addition, the use of catalytic softening agents or peptizers enables the reclaiming process to be carried out at lower temperatures, in a shorter time, or with less added oil and will result in a reduction of tailings. The peptizers are of many different types, including monoaryl hydrazines, dihydro aryl sulfides, thiophenols, mercaptans, secondary amines.

As the major source of rubber scrap for reclaiming is vehicular tires, which of course contain fibers, the aqueous or digester process represents the principal commercial reclaiming method. The digester process produces a washed reclaim that finds a special use in such grades of rubber goods as automobile tire sidewalls.

This invention is directed to an improvement in the digester process for reclaiming vulcanized rubber scrap. The aqueous reclaim produced by the digester process must be dried to a low enough water content to permit refining of the particles into a homogeneous sheet. This has been accomplished in the past by passing the wet reclaim from the digester through a hot air dryer wherein large volumes of air heated to a temperature usually between 180°–220° F. is forced across or through the wet reclaim to remove the excess moisture. In this drying operation, essentially all of the volatile reclaiming "oils" present in the reclaim are removed along with the excess moisture in the flow of hot air. The fact that natural and synthetic rubbers, such styrene-butadiene elastomers, are degraded at elevated temperatures in the presence of oxygen and/or oxygen containing gases such as air, limited the temperature at which such rubbers could be dried with hot air and thereby required the aforementioned large uneconomical volumes of heated air. The presence of the volatile reclaiming "oils" in the oxygen containing drying gases also presented a fire hazard. In addition, the volatile reclaiming oil vapors caused pollution of the surrounding atmosphere. When employing hot air type dryers, it is not economical to recover the reclaiming oil vapors, as the concentration of the oils in the drying gases is held at a minimum well below the saturation level with a resultant dew point below 32° F. to reduce the fire hazard. The low concentration of reclaiming oil vapors in the drying gases is also due to the large volumes of hot air that must be employed in order to effectively remove the excess moisture with hot air at a temperature of 220° F. or below.

It is an object of this invention to produce a reclaim rubber having improved tensile properties, even after oxygen aging.

It is a further object of this invention to reduce the amount of reclaiming oils necessary to produce a reclaim rubber having a given Mooney viscosity, or to produce a reclaim rubber having a lower Mooney viscosity while employing the same amount of reclaiming oil used in the digester process with hot air drying.

Another object of this invention is to reduce the degree of depolymerization in the rubber that takes place in the production of reclaim rubber.

An additional object of this invention is to provide for the recovery of the reclaiming oils thereby allowing such oils to be reused, reducing the fire hazard and reducing air pollution.

It is also an object of the invention to reduce the steam or power consumption involved in drying the aqueous reclaim.

The foregoing objects of invention and additional objects are accomplished by drying and cooling the wet reclaim in the absence of air wherein the heating and cooling mediums are separated from the wet reclaim by impermeable heat transfer surfaces, the water vapor and reclaiming oil vapors being withdrawn, condensed and separated.

The invention can be quickly understood by referring to the accompanying drawing which discloses the various stages of this process. Initially the vulcanized rubber scrap, water and optional additives are placed in a digester to plasticize the scrap. The resulting aqueous reclaim may then be placed in a squeezer to dewater the reclaim prior to charging said reclaim into a dryer. Heat is supplied to the dryer so that a dry reclaim product preferably containing about 8% water is obtained. In addition the vapors which are evolved in the dryer stage are withdrawn from the dryer and are passed through a condenser and the condensate separated into the oil and water phases. This soil may then be recycled to the digester stage.

The present invention is applicable to the reclaiming of both natural and synthetic vulcanized rubber scrap and mixtures thereof. The synthetic rubber in the scrap may be the product of the emulsion polymerization in the presence of a free radical catalyst of the peroxide or azo type of one or more butadienes-1,3, for example, butadiene-1,3,2-methylbutadiene-1,3 (isoprene, 2-chloro-butadiene-1,3 (chloroprene), 2,3-dimethyl-butadiene-1,3-piperylene, or a mixture of one or more such butadienes-1,3 with one or more other polymerizable compounds which are capable of forming rubber copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadiene-1,3 hydrocarbons are aryl olefins, such as styrene and vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride. Common commercial synthetic rubbers of this type are GR-S (copolymer of a major proportion of butadiene and a minor proportion of styrene), Paracril (copolymer of a major proportion of butadiene and a minor proportion of acrylonitrile), and neoprene (polymerized chloro-2-butadiene-1,3). The synthetic rubber may also be the product of the polymerization of a mixture of a major proportion of isoolefin and a minor proportion of conjugated diene at low temperature in the presence of a Friedel-Crafts polymerization catalyst of the type of aluminium chloride or boron trifluoride. An example of a commercial synthetic rubber of this type is Butyl rubber, which is a copolymer of about 96 to 99.5 parts of isobutylene and correspondingly 4 to 0.5 parts of isoprene.

In accordance with this invention, wet reclaimed scrap elastomers of the type above-mentioned, which have been treated in a digester to plasticize the scrap and to partially or wholly destroy the fiber if any contained therein, are dried in the substantial absence of air or where no effort is made to introduce air directly into or through the wet reclaim, the necessary heat being supplied by means other than hot air with the resulting volatile vapor being withdrawn by any suitable means. Thereafter, the reclaim stock of desired volatile content, which is at a temperature considerably above that considered practical for drying in the presence of air without initiating oxygen degradation, is cooled in the substantial absence of air. The cooling operation may be effected by discharging the reclaim from the dryer into any closed cold vessel or container. Before drying the aqueous reclaim coming from the digester, the reclaim may be dewatered, if desired, in a squeeze type press.

More specifically, the wet reclaim is dried by mechanically agitating the same within a closed container in such a manner that air is essentially excluded with the necessary heat being applied externally through the container walls and/or through heating elements extending into the container in direct contact with the reclaim stock. The source of heat is in no way limited since an impermeable heat transfer surface is always present between the heating media and the reclaim stock. The volatile water and oil vapors from the heated reclaim in the enclosed container are naturally or forceably withdrawn, condensed and separated. The hot dried reclaim stock is then discharged into a similar closed container for cooling in the same manner so as to exclude air.

The process of this invention may best be practiced by subjecting the wet reclaimed elastomers to mechanical agitation in a closed internal agitator of the screw or blade type with heat being supplied through any or all of the container walls, screws, and blades. Preferably an internal mixer-dryer, such as that known as the Holo-Flite dryer (U.S. Patent 2,731,241 issued January 17, 1956), is employed for this purpose. This dryer generally comprises, either a single hollow core screw or multiple hollow core screws arranged side-by-side within an enclosed chamber in such a manner that stock, fed into one end, is agitated and transferred to the opposite end. Heat is transferred through a wall jacket on the chamber and through the hollow core screws, preferably by circulating steam but in no way limited to this source. Hot liquids such as Dowtherm or other suitable oils may be employed. Dowtherm is a commercially available heat transfer medium and is understood to be a mixture of diphenyloxide and diphenyl, i.e., Dowthern A is understood to contain 73.5% diphenyloxide and 26.5 diphenyl. For the purpose of the present invention, it is essential that the enclosed dryer be sealed off from the air in order to minimize degradation of the elastomers in an oxygen containing atmosphere. In a non-continuous type of operation where wet reclaim is loaded into a large dryer, all openings such as entry doors loading ports, etc. should be closed in such a manner as to minimize the entry of air during the drying and volatile vapor removal. In the preferred continuous operation of the type wherein the aforementioned Holo-Flite dryer is employed and wet reclaim stock is continuously added and dry stock is continuously discharged, mechanically operated doors or flaps, such as rotary valves, effectively minimize the direct passage of air into the dryer.

A typical covered Holo-Flite drier is one equipped with rotary valves at the entrance and discharge openings, two screws arranged side-by-side having a screw diameter of seven inches and an effective length between entrance and discharge openings of approximately 10 feet. More than one Holo-Flite drier may be employed in series if desired. The jacket heat source is low pressure steam at between 10 to 15 p.s.i.g., preferably 15 p.s.i.g., and the screw heat source is high pressure steam at between 50-175 p.s.i.g. preferably 100 p.s.i.g. The screws are rotated at speeds of from 2-8 r.p.m., preferably 8 r.p.m., to afford the desired agitation. The wet reclaimed elastomers are gradually heated in the dryer to temperatures above 212° F., preferably not over 220° F., and dried to a 5-12% volatile content, preferably a 8% volatile content. The water and volatile oils present in the heated dryer are removed as vapors naturally or by vacuum through a conduit attached to the forward end of the screw dryer to a cooling or condensation apparatus such as a conventional tube-and-shell of barometric water spray condenser. The condensate readily separates into a water layer and a reclaiming oil layer, which can be reused in the digester reclaiming process. Unlike the case in the hot air drying process, the instant drying process does not involve any incondensable gases which could carry off the oils and water. In addition, such hot air dryers with large volumes of air required approximately two pounds of steam as an air heating medium per pound of reclaim dried, whereas the present process with a Holo-Flite dryer requires approximately 1.2 pounds of heating steam per pound of reclaim to be dried.

The dried reclaimed elastomers are discharged from the dryer into a cooling chamber which is also sealed off from the air by any suitable door, flap or rotary valve. Preferably, another mixer-dryer, such as the covered Holo-Flite previously described, is employed so as to exclude air with a cooling fluid being circulated within the jacket and hollow core screws to provide rapid cooling. In such a case, the drier and cooler are preferably connected by a suitable conduit for the passage of reclaim so as to prevent contact with the atmosphere prior to the cooling operation. In batch type drying, the dryer may also be used as a cooler by the use of a cooling fluid in place of the heating media. The reclaimed stock is discharged from the cooler at a temperature below 200° F., preferably at 150° F.

The following examples illustrate the invention. All parts and percentages referred to herein are by weight.

Example I

A commercial type reclaim, prepared from scrap vehicular tires and comminuted so no particles exceeded ¼" in size, was digested for 5 hours at a temperature of 387° F. The scrap was digested in the following mixture:

| Material: | Parts by weight |
|---|---|
| Comminuted scrap | 100 |
| Tall oil pitch | 8 |
| Pine oil | 3 |
| Mineral spirits | 21 |
| Calcium chloride | 1 |
| Water | 200 |

After digestion, the reclaim was dewatered in a squeeze type press.

The resulting wet stock was processed in a Holo-Flite dryer consisting of two hollow core revolving screws arranged side-by-side within an enclosed chamber in such a manner that stock, fed into one end through a rotary valve, was conveyed to the opposite end and discharged through a rotary valve. The hollow screws were heated with 90 p.s.i.g. steam and the jacket was heated with 12 p.s.i.g. steam. The screws were revolved at 8 revolutions per minute and the stock was dried to a 5 minute Cenco moisture balance loss of 8.2%. The Cenco moisture balance is a commercially available instrument which determines moisture by heat drying under infrared radiation. The present determinations were made using a 125 watt infrared lamp at a 100 volt setting on the autotransformer. The volatile losses (water and reclaiming oils) were read from the calibrated scale at the time intervals stated.

A first sample of the above dried reclaim was cooled in a polyethylene bag in the substantial absence of air. A second sample of the same dried reclaim was cooled by spreading it out in the open atmosphere. A third sample of digested reclaim was dried in a conventional hot air dryer at 180° F. air temperature to a five minute Cenco Moisture balance loss of 8.6%. All three samples were mixed as follows:

| Material: | Parts by weight |
|---|---|
| Dried sample | 82 |
| Tailings (reprocessed) | 12 |
| Carbon black | 2 |
| Mineral rubber | 3 |
| Clay | 1 |
| | 100 |

The three samples were then finished by being passed three times between two rolls having a friction ratio greater than one, thereby producing thin homogeneous sheets suitable for use as virgin rubber. At this point, Mooney viscosity was determined for each sample. Each sample was then mixed in a formula suitable for the production of automotive tire sidewalls, as follows:

| Material: | Parts by weight |
|---|---|
| Sample | 100.00 |
| Masterbatch | 152.7 |
| Sulfur | 3.25 |

The masterbatch employed had the following composition:

| Material: | Parts by weight |
|---|---|
| GR–S (styrene-butadiene) | 100.00 |
| Smoked sheet | 100.00 |
| Carbon black | 80.00 |
| Zinc oxide | 8.00 |
| Paraflux | 12.00 |
| Stearic acid | 2.00 |
| Condensation Product of Acetone and Diphenylamine | 1.00 |
| N,N-diphenyl phenylenediamine | 0.34 |
| 2-mercaptobenzothiazole | 1.60 |
| Diphenylguanidine | 0.40 |

The samples, which were cured in a uniform manner, had the following physical properties:

| | Air Dried | Non Air Dried | |
|---|---|---|---|
| | | Non Air Cooled | Air Cooled |
| Unaged: | | | |
| Elongation (percent): | | | |
| 15 min. cure at 292° F | 640 | 635 | 625 |
| 30 min. cure at 292° F | 565 | 580 | 560 |
| 45 min. cure at 292° F | 505 | 530 | 510 |
| 60 min. cure at 292° F | 490 | 515 | 465 |
| 300% Modulus (p.s.i.): | | | |
| 15 min. cure at 292° F | 510 | 510 | 540 |
| 30 min. cure at 292° F | 870 | 810 | 880 |
| 45 min. cure at 292° F | 1,000 | 990 | 1,060 |
| 60 min. cure at 292° F | 1,090 | 1,020 | 1,110 |
| Tensile (p.s.i.): | | | |
| 15 min. cure at 292° F | 1,530 | 1,440 | 1,480 |
| 30 min. cure at 292° F | 2,040 | 2,110 | 1,950 |
| 45 min. cure at 292° F | 2,080 | 2,150 | 2,040 |
| 60 min. cure at 292° F | 2,120 | 2,140 | 1,960 |
| Viscosity MLR 1-1½ at 180° F | 53 | 40 | 40 |
| Aged 120 hours in $O_2$ at 70° C.: | | | |
| Elongation (percent): | | | |
| 15 min. cure at 292° F | 550 | 565 | 525 |
| 30 min. cure at 292° F | 450 | 475 | 450 |
| 45 min. cure at 292° F | 410 | 430 | 360 |
| 60 min. cure at 292° F | 350 | 405 | 340 |
| 300% Modulus (p.s.i.): | | | |
| 15 min. cure at 292° F | 790 | 730 | 700 |
| 30 min. cure at 292° F | 1,070 | 1,000 | 1,030 |
| 45 min. cure at 292° F | 1,110 | 1,110 | 1,160 |
| 60 min. cure at 292° F | 1,140 | 1,080 | 1,200 |
| Tensile (p.s.i.): | | | |
| 15 min. cure at 292° F | 1,480 | 1,420 | 1,230 |
| 30 min. cure at 292° F | 1,560 | 1,540 | 1,480 |
| 45 min. cure at 292° F | 1,460 | 1,510 | 1,370 |
| 60 min. cure at 292° F | 1,310 | 1,440 | 1,310 |

Generally speaking, the sample that was dried and cooled in the absence of air had higher elongation and tensile values, the 300% modulus values being more comparable. The oxygen aged samples also indicated the superiority of the sample that was dried and cooled in the absence of air. This data indicates that a tire compounded with such a non air dried and non air cooled reclaim stock will have higher initial strength and elongation and will retain this advantage even after oxygen aging. The lower Mooney viscosities obtained with the samples that were dried in the absence of air indicate that the amounts of reclaiming oils employed could be reduced and still obtain the same Mooney viscosity as that obtained with the air dried sample. A reduction in the amounts of reclaiming oils results in a reclaimed elastomer having a higher rubber content which obviously is desirable.

The drying procedure was also identical to that employed in Example I except the dryer was also employed as a cooler upon a completion of the drying cycle, the steam being shut off and cooling water being circulated through both the hollow core screws and the jacket. The resulting physical properties were as follows:

|  | Air Dried & Cooled | | Non Air Dried & Cooled | |
| --- | --- | --- | --- | --- |
|  | Unaged | Aged 120 hrs. in O₂ at 70° C. | Unaged | Aged 120 hrs. in O₂ at 70° C. |
| Elongation (percent): | | | | |
| 15 min. cure at 292° F | 650 | 545 | 635 | 550 |
| 30 min. cure at 292° F | 570 | 445 | 545 | 440 |
| 45 min. cure at 292° F | 520 | 425 | 530 | 425 |
| 60 min. cure at 292° F | 525 | 400 | 535 | 400 |
| 300% Modulus (p.s.i.): | | | | |
| 15 min. cure at 292° F | 590 | 690 | 620 | 680 |
| 30 min. cure at 292° F | 840 | 960 | 870 | 950 |
| 45 min. cure at 292° F | 970 | 930 | 990 | 960 |
| 60 min. cure at 292° F | 870 | 960 | 920 | 940 |
| Tensile (p.s.i.): | | | | |
| 15 min. cure at 292° F | 1,670 | 1,300 | 1,760 | 1,290 |
| 30 min. cure at 292° F | 2,080 | 1,360 | 2,100 | 1,370 |
| 45 min. cure at 292° F | 2,120 | 1,270 | 2,120 | 1,320 |
| 60 min. cure at 292° F | 2,000 | 1,230 | 2,020 | 1,240 |

Example II

The procedure of Example I was repeated using another commercial type reclaim while omitting the step of dewatering in a squeeze type press before drying. The samples had the following physical properties, which were generally equivalent to those obtained in Example I:

|  | Air Dried | Non Air Dried | |
| --- | --- | --- | --- |
|  |  | Non Air Cooled | Air Cooled |
| Unaged: | | | |
| Elongation (percent): | | | |
| 15 min. cure at 292° F | 635 | 655 | 635 |
| 30 min. cure at 292° F | 545 | 580 | 585 |
| 45 min. cure at 292° F | 545 | 550 | 530 |
| 60 min. cure at 292° F | 510 | 525 | 510 |
| 300% Modulus (p.s.i.): | | | |
| 15 min. cure at 292° F | 560 | 430 | 470 |
| 30 min. cure at 292° F | 890 | 800 | 730 |
| 45 min. cure at 292° F | 990 | 930 | 1,000 |
| 60 min. cure at 292° F | 1,030 | 1,060 | 1,010 |
| Tensile (p.s.i.): | | | |
| 15 min. cure at 292° F | 1,500 | 1,160 | 1,300 |
| 30 min. cure at 292° F | 2,000 | 1,930 | 1,860 |
| 45 min. cure at 292° F | 2,160 | 2,090 | 2,140 |
| 60 min. cure at 292° F | 2,030 | 2,110 | 2,100 |
| Aged 120 hours in O₂ at 70° C.: | | | |
| Elongation (percent): | | | |
| 15 min. cure at 292° F | 515 | 580 | 565 |
| 30 min. cure at 292° F | 435 | 480 | 460 |
| 45 min. cure at 292° F | 340 | 365 | 425 |
| 60 min. cure at 292° F | 345 | 375 | 375 |
| 300% Modulus (p.s.i.): | | | |
| 15 min. cure at 292° F | 680 | 610 | 550 |
| 30 min. cure at 292° F | 980 | 840 | 960 |
| 45 min. cure at 292° F | 1,060 | 1,030 | 930 |
| 60 min. cure at 292° F | 1,100 | 1,050 | 1,050 |
| Tensile (p.s.i.): | | | |
| 15 min. cure at 292° F | 1,180 | 1,190 | 990 |
| 30 min. cure at 292° F | 1,330 | 1,310 | 1,400 |
| 45 min. cure at 292° F | 1,180 | 1,300 | 1,260 |
| 60 min. cure at 292° F | 1,250 | 1,300 | 1,260 |
| Viscosity MLR 1-1½ at 180° F | 62 | 52 | 44 |

Example III

The procedure of Example I was repeated except the scrap vehicular tires were digested in an alkaline solution. The scrap was digested in the following mixture:

Material: Parts by weight
- Comminuted scrap _____ 100
- Tall oil pitch _____ 14
- Pine oil _____ 3
- Mineral spirits _____ 12
- Calcium chloride _____ 1
- Sodium hydroxide (50% solution) _____ 6
- Water _____ 200

Example IV

A commercial type reclaim, prepared from scrap vehicular tires comminuted so no particles exceed ¼" in size containing two-thirds the normal amount of mineral spirits reclaiming oil, was digested for five hours at 387° F. The scrap was digested in the following mixture:

| Material | Parts by Weight | |
| --- | --- | --- |
|  | Air Dried and Cooled | Non Air Dried and Cooled |
| Comminuted Scrap | 100 | 100 |
| Tall Oil Pitch | 8 | 8 |
| Pine Oil | 3 | 3 |
| Mineral Spirits | 15 | 10 |
| Calcium Chloride | 1 | 1 |
| Water | 200 | 200 |

The reclaimed stock was dewatered in a squeeze type press, and dried and cooled in a non air type drier as in Example I. The procedure of Example I was also employed in the subsequent finishing and testing. The physical property data obtained was compared to the conventional reclaim dried in a conventional hot air type dryer, compounded in the tire side-wall recipe of Example I.

|  | Air Dried and Cooled | Non Air Dried and Cooled |
| --- | --- | --- |
| Viscosity: | | |
| MLR 1-1½ at 180° F | 48 | 46 |
| MLR 1-3 at 212° F | 31 | 38 |
| Acetone Extract (percent) | 20.75 | 20.51 |
| Chloroform Extract (percent) | 8.34 | 7.81 |

|  | Air Dried | | Non Air Dried and Cooled | |
|---|---|---|---|---|
|  | Unaged | Aged 48 hrs. in O₂ at 70° C. | Unaged | Aged 48 hrs. in O₂ at 70° C. |
| Elongation (percent): | | | | |
| 15 min. cure at 292° F | 705 | 655 | 680 | 640 |
| 30 min. cure at 292° F | 625 | 585 | 630 | 545 |
| 45 min. cure at 292° F | 610 | 555 | 570 | 510 |
| 60 min. cure at 292° F | 605 | 530 | 585 | 520 |
| 300% Modulus (p.s.i.): | | | | |
| 15 min. cure at 292° F | 375 | 520 | 300 | 550 |
| 30 min. cure at 292° F | 600 | 700 | 600 | 740 |
| 45 min. cure at 292° F | 650 | 740 | 675 | 900 |
| 60 min. cure at 292° F | 625 | 820 | 750 | 850 |
| Tensile (p.s.i.): | | | | |
| 15 min. cure at 292° F | 1,550 | 1,325 | 1,225 | 1,380 |
| 30 min. cure at 292° F | 1,900 | 1,575 | 1,950 | 1,650 |
| 45 min. cure at 292° F | 2,025 | 1,580 | 1,925 | 1,675 |
| 60 min. cure at 292° F | 1,900 | 1,500 | 2,050 | 1,650 |

The above data shows that the non air dried reclaim, although digested with one-third less mineral spirits, had approximately the same viscosity as the air dried reclaim. The reduction in oil represents a considerable savings in the cost of reclaiming. This lower oil charge is reflected in a lower acetone extractable content which indicates a higher rubber hydrocarbon content. The lower chloroform extract obtained with the non air dried and cooled reclaim stock and the change in Mooney viscosities as taken at 180° F. and 212° F. indicate less formation of lower molecular weight rubber chain fragments, i.e. a reduction in the extent of depolymerization. This is desirable as small chain fragments yield a rubber having poorer physical properties.

*Example V*

The procedure of Example IV was repeated except that the pine oil content was reduced 50%. The scrap was digested in the following mixture.

| Material | Parts by Weight | |
|---|---|---|
|  | Air Dried | Non Air Dried and Cooled |
| Comminuted Scrap | 100 | 100 |
| Tall Oil Pitch | 8 | 8 |
| Pine Oil | 3 | 1.5 |
| Mineral Spirits | 15 | 15 |
| Calcium Chloride | 1 | 1 |
| Water | 200 | 200 |

The physical properties of the above reclaims, compounded in the tire sidewall recipe of Example I, were as follows:

|  | Air Dried and Cooled | Non Air Dried and Cooled |
|---|---|---|
| Viscosity: | | |
| MLR 1-1½ at 180° F | 48 | 54 |
| MLR 1-3 at 212° F | 34 | 43 |
| Acetone Extract (percent) | 20.75 | 20.40 |
| Chloroform Extract (percent) | 8.34 | 7.43 |

|  | Non Air Dried and Cooled | |
|---|---|---|
|  | Unaged | Aged 48 hrs. in O₂ at 70° C. |
| Elongation (percent): | | |
| 15 min. cure at 292° F | 670 | 625 |
| 30 min. cure at 292° F | 615 | 560 |
| 45 min. cure at 292° F | 585 | 510 |
| 60 min. cure at 292° F | 555 | 475 |
| 300% Modulus (p.s.i.): | | |
| 15 min. cure at 292° F | 325 | 520 |
| 30 min. cure at 292° F | 600 | 820 |
| 45 min. cure at 292° F | 750 | 870 |
| 60 min. cure at 292° F | 775 | 920 |
| Tensile (p.s.i.): | | |
| 15 min. cure at 292° F | 1,225 | 1,420 |
| 30 min. cure at 292° F | 1,925 | 1,630 |
| 45 min. cure at 292° F | 2,025 | 1,630 |
| 60 min. cure at 292° F | 2,025 | 1,500 |

The above data should be compared with the results obtained with the air dried sample in Example IV. Again, the acetone and chloroform extracts of the non air dried and cooled sample are lower and the oxygen aged tensile values in particular are higher than the values obtained with the air dried sample. Although 50% less pine oil was employed with the non air dried and cooled sample, the resulting Mooney viscosities are generally comparable.

*Example VI*

The procedure of Example IV was again repeated except that the tall oil pitch plasticizer content was reduced by 25%. The aqueous reclaim digester recipe was as follows:

| Material | Parts by Weight | |
|---|---|---|
|  | Air Dried and Cooled | Non Air Dried and Cooled |
| Comminuted Scrap | 100 | 100 |
| Tall Oil Pitch | 8 | 6 |
| Pine Oil | 3 | 3 |
| Mineral Spirits | 15 | 15 |
| Calcium Chloride | 1 | 1 |
| Water | 200 | 200 |

The physical properties of the above reclaims, compounded in the tire sidewall recipe of Example 1, were as follows:

|  | Air Dried and Cooled | Non Air Dried and Cooled |
|---|---|---|
| Viscosity |  |  |
| MLR 1-1½ at 180° F | 48 | 42 |
| MLR 1-3 at 212° F | 34 | 37 |
| Acetone Extract (percent) | 20.75 | 19.27 |
| Chloroform Extract (percent) | 8.34 | 6.50 |
| RHC (direct) percent | 22.40 | 23.45 |
| RHC (difference) percent | 45.47 | 45.77 |

|  | Non Air Dried and Cooled | |
|---|---|---|
|  | Unaged | Aged 48 hrs. in O₂ at 70° C. |
| Elongation (percent): |  |  |
| 15 min. cure at 292° F | 690 | 625 |
| 30 min. cure at 292° F | 650 | 580 |
| 45 min. cure at 292° F | 610 | 535 |
| 60 min. cure at 292° F | 580 | 525 |
| 300% Modulus (p.s.i.): |  |  |
| 15 min. cure at 292° F | 200 | 375 |
| 30 min. cure at 292° F | 450 | 660 |
| 45 min. cure at 292° F | 600 | 750 |
| 60 min. cure at 292° F | 650 | 840 |
| Tensile (p.s.i.): |  |  |
| 15 min. cure at 292° F | 900 | 1,080 |
| 30 min. cure at 292° F | 1,650 | 1,550 |
| 45 min. cure at 292° F | 1,850 | 1,540 |
| 60 min. cure at 292° F | 1,825 | 1,550 |

RHC (direct) refers to a determination of the natural rubber content of the reclaim (see ASTM Bulletin 12D (1943) 23–26). RHC (difference) refers to a determination of the synthetic rubber content of the reclaim. In this example, the tall oil pitch plasticizer was reduced by 25% again yielding a reclaim stock, after non air drying and cooling, having a generally equivalent Mooney viscosity, lower acetone and chloroform extracts, and higher hydrocarbon content as compared to air dried reclaim. In the above data, the unaged physical properties of the non air dried and cooled reclaim may be considered to be silghtly poorer but the oxygen aged physical properties are generally equivalent to those of the air dried sample of Example IV.

*Example VII*

A commercial type reclaim was formulated for the digester process as follows.

| Material: | Parts by weight |
|---|---|
| Comminuted debeaded tire scrap | 100.00 |
| Pine oil | 3.88 |
| Mineral spirits | 5.94 |
| Mixed di-xylyl disulfides | 0.188 |
| Pine pitch | 8.12 |
| Oils recovered from dryer and re-used | 6.50 |

The above charge was digested for 4.5 hours using 225 p.s.i. steam both in the jacket and internally. Approximately one-half of the batch was dried in a conventional hot air type dryer at 190°–200° F. and the other half was dried and cooled in a non-air Holo-Flite dryer using 140 p.s.i.g. steam in the screw and 12 p.s.i.g. steam in the jacket as a heating media. A sample of each stock was then refined to a homogeneous sheet. The following test data was obtained:

|  | Air Dried and Cooled | Non Air Dried and Cooled |
|---|---|---|
| Cenco Moisture balance loss, 5 min | 15.4 | 13.0 |
| MLR 1-1½ at 180° F | 55 | 47 |
| MLR 1-3 at 212° F | 44 | 39 |
| Unaged: |  |  |
| Elongation (percent): |  |  |
| 15 min. cure at 292° F | 600 | 650 |
| 30 min. cure at 292° F | 510 | 550 |
| 45 min. cure at 292° F | 525 | 540 |
| 60 min. cure at 292° F | 540 | 540 |
| 300% Modulus (p.s.i.): |  |  |
| 15 min. cure at 292° F | 650 | 550 |
| 30 min. cure at 292° F | 895 | 840 |
| 45 min. cure at 292° F | 850 | 750 |
| 60 min. cure at 292° F | 825 | 850 |
| Tensile (p.s.i.): |  |  |
| 15 min. cure at 292° F | 1,800 | 1,900 |
| 30 min. cure at 292° F | 2,000 | 2,100 |
| 45 min. cure at 292° F | 1,950 | 2,050 |
| 60 min. cure at 292° F | 2,000 | 2,050 |
| Aged 120 hours in O₂ at 70° C.: |  |  |
| Elongation (percent): |  |  |
| 15 min. cure at 292° F | 500 | 550 |
| 30 min. cure at 292° F | 450 | 455 |
| 45 min. cure at 292° F | 435 | 425 |
| 60 min. cure at 292° F | 400 | 415 |
| 300% Modulus (p.s.i.): |  |  |
| 15 min. cure at 292° F | 800 | 770 |
| 30 min. cure at 292° F | 830 | 935 |
| 45 min. cure at 292° F | 850 | 935 |
| 60 min. cure at 292° F | 920 | 925 |
| Tensile (p.s.i.): |  |  |
| 15 min. cure at 292° F | 1,435 | 1,630 |
| 30 min. cure at 292° F | 1,255 | 1,460 |
| 45 min. cure at 292° F | 1,300 | 1,340 |
| 60 min. cure at 292° F | 1,260 | 1,335 |

While the preferred form of this invention has been described herein, it will be understood that changes in the details thereof may be made without departing from the spirit of this invention, and it is intended to cover all those changes which come within the scope of the appended claims.

Having thus described our invention, what we claim and desire to protect by Letters Patent is:

1. In the digestion process for reclaiming vulcanized rubber scrap by heating comminuted vulcanized rubber scrap in admixture with a substantial volume of water to produce an aqueous reclaim and thereafter drying the said aqueous reclaim to a milleable condition, the improvement consisting of drying the said aqueous reclaim at a temperature not substantially in excess of 220° F. in a substantially oxygen-free atmosphere.

2. In the digestion process for reclaiming vulcanized rubber scrap by heating comminuted vulcanized rubber scrap in admixture with a substantial volume of water to produce an aqueous reclaim and thereafter drying the said aqueous reclaim to a millable condition, the improvement consisting of drying the said aqueous reclaim at a temperature not substantially in excess of 220° F. in a substantially oxygen-free atmosphere, and thereafter cooling the dried reclaim to a temperature below 200° F. in a substantially oxygen-free atmosphere.

3. The improvement of claim 2 wherein said dried reclaim is cooled to a temperature below approximately 150° F. in a substantially oxygen-free atmosphere.

References Cited by the Examiner

UNITED STATES PATENTS

| 2,469,529 | 5/1949 | Tewksbury et al. | 260—2.3 |
| 2,653,915 | 9/1953 | Elgin et al. | 260—2.3 |
| 2,713,241 | 1/1956 | Christian | 257—95 |
| 2,871,205 | 1/1959 | Mankowich et al. | 260—2.3 |
| 3,048,218 | 8/1962 | Gunther | 260—2.3 |

MURRAY TILLMAN, *Primary Examiner.*

LEON J. BERCOVITZ, *Examiner.*

K. B. CLARKE, W. L. BASCOMB, D. J. BREZNER, *Assistant Examiners.*